June 6, 1939.  H. A. ANDERSON  2,161,271
BOLT
Filed Jan. 19, 1937
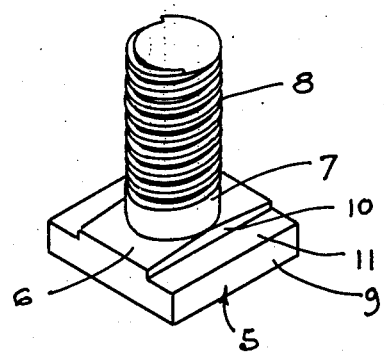
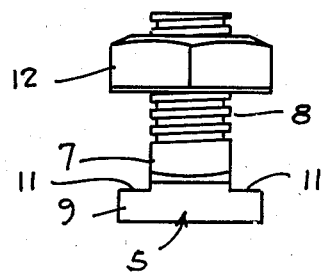 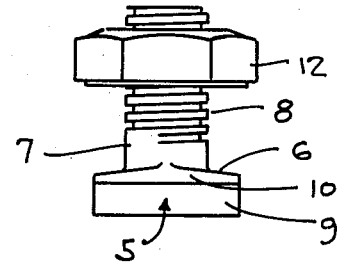
INVENTOR.
HAROLD A. ANDERSON
BY Joseph F. Westall
ATTORNEY.

Patented June 6, 1939

2,161,271

UNITED STATES PATENT OFFICE 2,161,271

BOLT

Harold A. Anderson, Los Angeles, Calif.

Application January 19, 1937, Serial No. 121,300

2 Claims. (Cl. 90—59)

This invention relates to bolts of the class adapted to be countersunk to prevent rotation in use and specifically contemplates improvements contributing to their more effective and reliable utility.

Bolts employed particularly in planer and sticker machines are often subject to torsional strain which tends to cause their displacement. Accordingly, to avoid the necessity for frequently replacing the bolts, and to eliminate accidents incident to their failure, the bolts must be of heavy and infallible construction. To prevent rotation, their heads are squared and countersunk in holes of the same shape and size. As the amount of resistance of the bolt head to rotation when in use depends primarily upon the area of its sides finding a bearing surface in the part where it is employed, which, in turn, is determined by the proportionate thickness of the head and the combined length of its edges, it is necessary, in the interests of safety, to provide large thin heads where the bolts are to be used in parts of a device of thin cross-section.

The tensile strength of conventional bolts as the strain is imposed in use depends primarily upon the size, depth and number of the threads on the shank of the bolt and in the nut employed therewith. As the strain imposed on such prior art threads is usually uniformly distributed over their sides the strength of the thread is weaker from its base to its crest due to its triangular shape in cross-section. Accordingly it is invariably the crest which first fails by turning over, resulting ultimately in "stripping" of the entire thread.

It is a principal object of the present invention to provide a bolt having a head of reduced surface area and a smaller offset protruding from the underside of the head, both the head and offset being squared to resist rotation in correspondingly-shaped holes of the member in which it is adapted for use, whereby the length of the edges of the bolt head is reduced to a minimum, yet affords with the offset, a maximum side surface area.

Another object is to provide a nut and bolt, each having thread of substantially uniform cross-section whereby the strength of the thread from base to crest is evenly proportioned with respect to the distribution of the strain normally imposed thereon.

Another object is the provision of an offset integrally formed with a bolt head to augment the flat side surface area afforded by the edges of the head, thus permitting a reduction in the size of the head and requiring a minimum displacement of material from the member in which it is adapted to seat in use.

Another object is to provide a flat head and an offset integral therewith having a convex undersurface extending from the shank of the bolt to the sides of the head to strengthen the junction of the shank and head by the radiated distribution of torsional strain across the width of the head.

Other objects and salient features of my invention will be apparent to those of skill in this art upon an examination of the following description read in the light of the accompanying drawing, in which—

Fig. 1 is a perspective view of the bolt of my invention;

Fig. 2 is a side elevation of the bolt with a nut in operative relation therewith;

Fig. 3 is an elevation of the nut and bolt taken at right angles to Fig. 2.

Referring to the drawing in detail, the numerals of which indicate similar parts throughout the several views, 5 designates the squared head of a bolt having a convex undersurface 6. The top side of the head is flat to enable the preservation of an uninterrupted surface where used on a flat member such as are found in planer and sticker machines. A circular shank 7 extends at right angles to the head from the center of the convex undersurface 6 and is provided with square threads 8. The sides of threads 8 are parallel with each other; the crest 8a of each thread is parallel to, and of substantially the same width as the base of the thread. The edges 9 of the head are parallel to the axis of shank 7, being adapted to engage the sides of a correspondingly-shaped depression in a member in which the bolt is employed.

At opposite sides of shank 7 the convex undersurface 6 is recessed, forming surfaces 10 which are parallel to shank 7 and two of the opposed edges 9 of the head. Extending laterally from the base of surfaces 10 to the edges 9, supporting surfaces 11 are formed by the recesses. Supporting surfaces 11 are parallel to the top of head 5 for purposes about to be described.

Encircling shank 7 a square nut 12 is rotatably and removably mounted in an obvious manner. Nut 12 is provided with threads (not shown) which are quadrilateral in cross-section, to correspond with the threads 8.

It will be observed that surfaces 10 increase the combined laterally-facing area of the bolt, normally consisting only of the side edges of the head, and accordingly augments the resistance of the head to rotative movement when in use. By extending the width of the head, surfaces 10 not only provide a more effective lever in preventing rotation, but strengthen the joinder of the shank and head, as will be obvious to those of skill in the art. The remaining portion of the convex undersurface 6 may either seat on concave portions of the member in which the bolt is used, or such support may be confined to flat surfaces 11, depending upon the contour of the opening through which the shank of the bolt extends in specific adaptations of its utility.

While I have shown a preferred embodiment of my invention, it will be obvious that various changes in size, proportion and shape of the component elements may be made as, for example, the surfaces 10 may be of different contour or angularly disposed with respect to all sides of the bolt head; the convex undersurface may have the form of a flat bevel; or V-shaped threads may be substituted for the square threads shown, without departing from the spirit of my invention as defined in the appended claims.

What I claim and desire to secure by Letters Patent is:

1. In a bolt, a head, an elongated offset on the undersurface of said head of a length equal to the distance between two opposed edges of said head, a threaded shank protruding from said offset, said offset having a convex undersurface and sides parallel to each other and axis of said shank.

2. In a bolt, a head having top and bottom surfaces parallel, an elongated offset on the underside of said head having a convex undersurface and flat sides equal in length to one edge of said head and perpendicular to the top and bottom surfaces of said head, a shank protruding from said offset, and helical threads encircling said shank, each thread having sides parallel to each other and a flat crest and base parallel to each other.

HAROLD A. ANDERSON.